United States Patent
Soon

(10) Patent No.: US 8,284,789 B2
(45) Date of Patent: Oct. 9, 2012

(54) METHODS AND APPARATUS FOR PROVIDING DYNAMIC DATA FLOW QUEUES

(75) Inventor: Yee Ming Soon, Tokyo (JP)

(73) Assignee: Tellabs Operations, Inc., Naperville, IL (US)

( * ) Notice: Subject to any disclaimer, the term of this patent is extended or adjusted under 35 U.S.C. 154(b) by 626 days.

(21) Appl. No.: 12/432,091

(22) Filed: Apr. 29, 2009

(65) Prior Publication Data

US 2010/0278189 A1 Nov. 4, 2010

(51) Int. Cl.
H04L 12/28 (2006.01)
(52) U.S. Cl. .................................................. 370/412
(58) Field of Classification Search .................. 370/412
See application file for complete search history.

(56) References Cited

U.S. PATENT DOCUMENTS

| 2004/0062261 A1* | 4/2004 | Zecharia et al. | 370/419 |
| 2005/0047411 A1* | 3/2005 | Kadambi et al. | 370/389 |
| 2005/0169254 A1* | 8/2005 | Kurita et al. | 370/352 |
| 2008/0095054 A1* | 4/2008 | Morford | 370/231 |

* cited by examiner

*Primary Examiner* — Ayaz Sheikh
*Assistant Examiner* — Hai-Chang Hsiung
(74) *Attorney, Agent, or Firm* — JW Law Group; James M. Wu

(57) ABSTRACT

A network system and method capable of creating separate output queues on demand to improve overall network routing performance are disclosed. The network system, in one embodiment, includes a classifier, an egress queuing device and a processor. The classifier provides a result of classification for an incoming data flow in accordance with a set of predefined application policies. The egress queuing device is an egress per flow queue ("PFQ") wherein a separately dedicated queue can be dynamically allocated within the egress PFQ in accordance with the result of classification. The processor is configured to establish a temporary circuit connection between the classifier and the egress queuing device for facilitating routing process.

16 Claims, 5 Drawing Sheets

METHODS AND APPARATUS FOR PROVIDING DYNAMIC DATA FLOW QUEUES

FIELD

The exemplary embodiment(s) of the present invention relates to communications network. More specifically, the exemplary embodiment(s) of the present invention relates to routing enhancement using separate output queues for packets transmitting.

BACKGROUND

A high-speed network environment typically includes network devices such as routers and switches used for facilitating delivery of information packets, data flow, and/or data traffic from source devices to destination devices via communication networks such as IP and/or packet-based networks. Information pertaining to the transfer of data packet(s) and/or frame(s) through the network(s) is usually embedded within the packet and/or frame itself. Each packet, for instance, traveling through multiple nodes via one or more communication networks such as Internet and/or Ethernet can typically be handled independently from other packets in a packet stream or traffic. Each node, for example, may include transmitting, switching, and/or bridging engines and is capable of processing incoming packet(s) or frame(s) and determines where the packet(s) or frame(s) should be forwarded.

In a high-speed computing network environment, it is critical to maintain high speed traffic flows with minimal data loss and/or packet drop when, for example, a data packet crosses multiple network devices from an ingress component to an egress component. To efficiently route the data per flow between the ingress component and the egress component, various flow queues such as egress aggregated priority queues and weighted queues are employed to improve transmitting efficiency. For example, egress aggregated priority and weighted queues are used to aggregate connectionless oriented packets before they are being transmitted. Due to the nature of connectionless oriented forwarding, the packet destination, for example, is typically obtained through a lookup mechanism after each packet enters the network. As such, exact egress destinations for typical connectionless packets are not known prior entering a network(s).

A problem associated with a conventional transmitting and/or routing scheme is that it lacks an end-to-end flow (or connection) in accordance with desirable bandwidth and quality of service ("QoS") for a connectionless packet network.

A conventional approach to mitigate the above-referenced problem is to add an ingress per flow queue ("PFQ"). A drawback associated with the ingress PFQ is that it typically queues incoming packets at the ingress side.

SUMMARY

A network system is capable of creating separate output queues on demand to improve overall network routing performance. The system, in one embodiment, includes a classifier, an egress queuing device and a processor. The classifier provides a result of classification for an incoming data flow in accordance with a set of predefined application policies. The egress queuing device is an egress per flow queue ("PFQ") wherein a separately dedicated queue can be dynamically allocated within the egress PFQ in accordance with the result of classification. The processor is configured to establish a temporary circuit connection between the classifier and the egress queuing device for facilitating routing process.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1A:
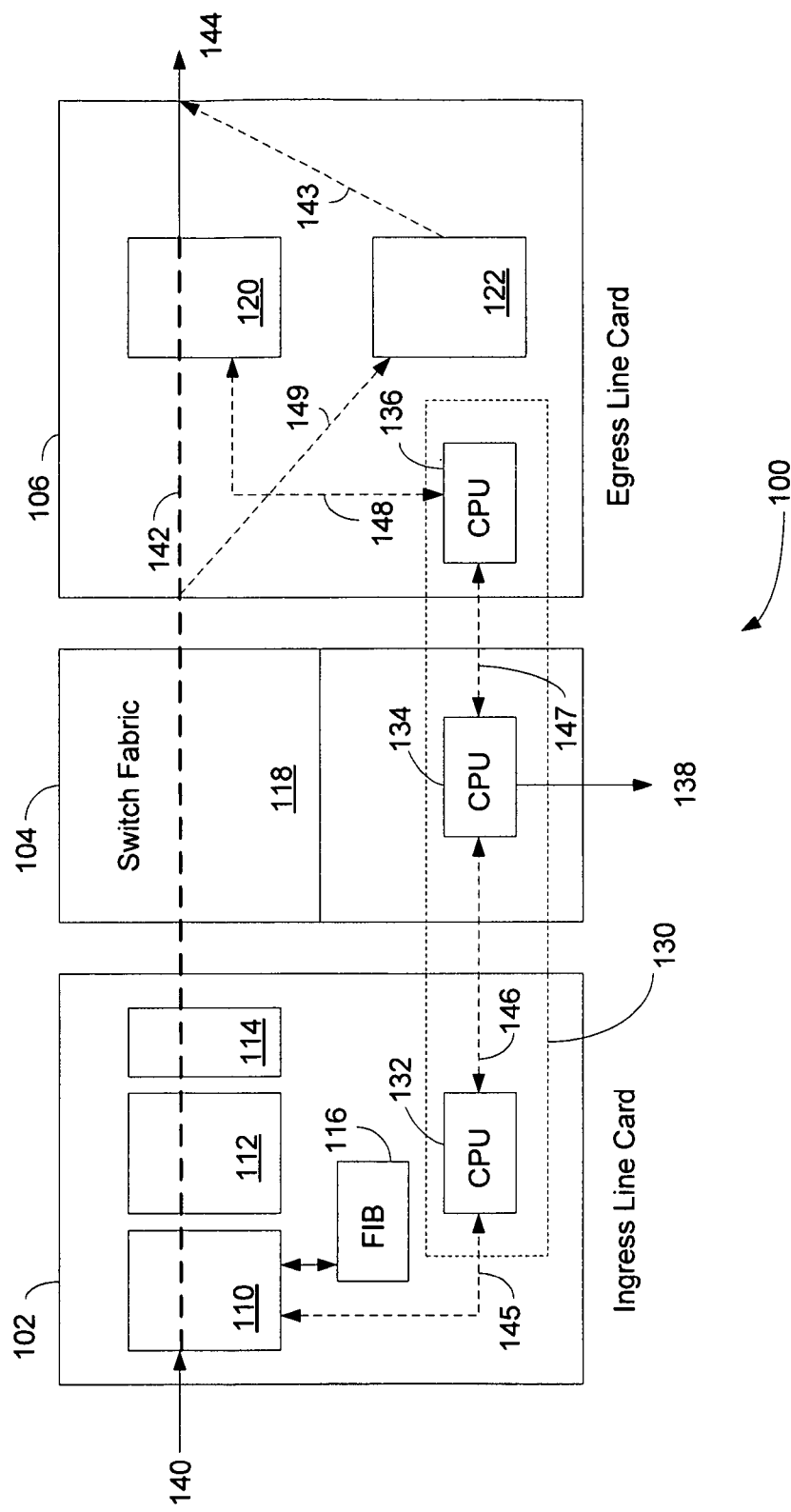
FIG. 1A is a block diagram illustrating a network configuration capable of enhancing routing performance using an egress per flow queue in accordance with one embodiment of the present invention.

Exemplary embodiment(s) of the present invention is described herein in the context of a method, device, and apparatus of creating separate egress queues on demand to improve overall network routing performance.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. It, however, will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure unless otherwise defined.

As used herein, the singular forms of article "a", "an" and "the" are intended to include the plural forms as well, unless the context clearly indicates otherwise. Also, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items A network system discloses a routing mechanism capable of creating separate egress or output queues on demand to improve overall network routing performance. The system, in one embodiment, includes a classifier, an egress per flow queue ("PFQ"), and a processor. The classifier provides a result of classification for an incoming data flow in accordance with a set of predefined application policies. A separately dedicated queue can be dynamically allocated within the egress PFQ in accordance with the result of classification. The processor is configured to establish a temporary circuit connection between the classifier and the egress queuing device for facilitating routing process.

It should be noted that the term "data packets" can also be referenced as "data stream," "data flow," "flow," "packet flow," "packet stream," "data frames," "information," "frames," et cetera. Moreover, connections may also include wires, wireless connections, cables, coax lines, telephone lines, Internet backbones, Ethernet connections, and so forth.

FIG. 1A is a block diagram illustrating a network configuration capable of enhancing routing performance using an egress per flow queue ("PFQ") in accordance with one embodiment of the present invention. Diagram 100 includes an ingress component 102, a switch fabric 104, and an egress component 106. In one embodiment, the network configuration includes a processing component 130, which may further include multiple processing units, configured to communicate with network management system(s) via a communication channel 138. It should be noted that the underlying concept of the exemplary embodiment(s) of the present invention would not change if one or more blocks (or elements or connections) were added to or removed from diagram 100.

Ingress component 102, also known as an ingress line card or ingress network element ("NE"), includes a classifier 110, a central processing unit ("CPU") 132, a forwarding information base ("FIB") 116, an ingress PFQ 112, and a virtual output queues ("VOQ") 114. To reduce routing blockage towards switch fabric 104, VOQ 114 provides multiple storage queues to facilitate the match between inbound and outbound interfaces. For example, VOQ 114 halts incoming packets at the queues while matching input interface(s) with output interface(s).

Classifier 110, also known as a packet classifier or an ingress classifier, includes a classification engine loaded with firmware and/or software capable of recognizing packet formats for various packet treatments. Packet treatments or flow applications include routing requirements, minimum bandwidth, transmitting rates, maximum delay, application classes, et cetera. After obtaining classification information such as packet identifiers ("IDs") and application policies, classifier 110 reads packet header information and compares the header information against a set of predefined information patterns for packet classification. Predefined information patterns of classification information can be Internet Protocol ("IP") destination address, Ethernet Media Access Control ("MAC") destination address, priority, Quality of Service ("QoS") marking bits, and so on. Predefined information patterns, in one embodiment, also includes classification policy information such as Transmission Control Protocol ("TCP"), User Datagram Protocol ("UDP") port numbers, matching 5-tuple information, packet length, and the like.

Once an incoming packet is classified, the result of the classification as known as flow classification is added or capsulated within the internal packet header for specific packet treatment(s). After encapsulation, the packet is forwarded to an egress port with an indication of priority flow or ordinary flow. In one example, classifier 110 classifies incoming packets based on access control list ("ACL") and FIB lookup tables, and subsequently appends classified information such as egress port ID and flow priority onto the packet header. Note that information relating to egress port or packet destination can be obtained, for instance, from one or more lookup tables located in FIB 116.

FIB 116, in one embodiment, is a storage device having at least one lookup table containing destinations for various data packets or flows. In addition, FIB 116 may also include forwarding information which are used to regulate the processing and forwarding of incoming packet traffic. Information such as egress port(s) and/or interfaces stored in FIB 116, in one example, can be populated by processing component 130 via control plane.

CPU 132 is a processing device capable of executing instructions. In one embodiment, processing component 130 includes three CPUs 132-136 wherein CPU 132, CPU 134, and CPU 136 are separately located at ingress component 102, switch fabric 104, and egress component 106, respectively. Alternatively, CPUs 132-136 can be merged into one single device. CPUs 132-136 are configured to deal with various tasks, such as route computation, filtering process, policy computation, policy enforcement, management/configuration, and so on. CPU 132 is coupled to classifier 110 via connection 146 and is capable of providing processing control to ingress component 102, switch component 104, and/or egress component 106.

Ingress PFQ 112 coupled with classifier 110 is employed to partially guarantee flow bandwidth and QoS in a multipoint environment. Ingress PFQ 112 includes multiple queues wherein such queues are created when policies are created during a system, router, and/or switch configuration. Note that such configurations can come from external operator configuration as well as dynamic on demand system invoked configurations. Once packets are classified in response to the application policies, packets are forwarded to corresponding or dedicated queues created by ingress PFQ 112. It should be noted that since policies can be applied to ports/interfaces manually, dedicated queues in ingress PFQ 112 can also be created and programmed manually. A function of ingress PFQ 112 is to guarantee the bandwidth and service class for an identified and/or priority packet flow.

Switching fabric 104 is a network switching apparatus capable of switching a data packet or flow from an input port to a corresponding output port. Switching fabric 104, for example, includes switching units (individual boxes) in a node and is configured to control switching paths. In one aspect, switching fabric 104 is coupled to processing component 130 for facilitating packet switching.

Egress component 106, also known as egress line card or egress NE, includes an egress PFQ 120, an output queue 122, and CPU 136. A function of egress component 106 is to forward packets or packet flows to their destination via one of a set of output ports. Various queues and storages are used to facilitate and/or schedule output data efficiently and fairly. Note that egress PFQ 120 and output queue 122 may be merged into one logic block. Egress component 106 may include other components, but are not shown in FIG. 1A since they are not necessary for understanding the embodiments of the present invention.

Priority flow and/or identified flow is a data flow or packet requiring special treatment. For identified packet flows, egress component 106 queues the packet flow in egress PFQ 120 before it is being forwarded to its destination over connection 144. For unidentified packet flows, on the other hand, egress component 106 queues the packet flow in output queue 122 before it is being forwarded to its destination over connection 144.

Output queue 122, in one embodiment, includes egress aggregate strict priority ("SP") and/or weighted Round Robin queues ("WRR"). Output queue 122, in one example, operates between 4-8 priority levels and is capable of implementing at a hierarchically scheduled fashion in various routers and switches. To achieve hierarchically shaped bandwidth services, the queues are, for instance, organized in aggregate queues, in which each queue can contain hundreds and thousands of packet flows.

Egress PFQ 120, in one embodiment, is an egress queuing device including a set of queues wherein each queue can be separated, allocated, or created on demand in accordance with the result of the packet classification. As described before, the result of flow or packet classification is generated in response to the packet ID, packet format(s), routing policies, and so forth. A function of egress PFQ 120 is to guarantee minimum bandwidth and packet services on a priority flow. By classifying a packet flow in view of queue length and hierarchical transmission rates, queuing outgoing packets locally onto dedicated queues can improve guaranteed bandwidth and service for an identified flow. In one embodiment, the egress queuing information, such as queue length, priority, hierarchical transmission rates, et cetera, is communicated to egress PFQ 120 via temporary circuits 145-148 managed by CPUs 132-136.

In one embodiment, classifier 110 includes a backchannel or a temporary backchannel capable of informing CPU 132 to create a temporary circuit-based connection 145 when classifier 110 identifies a priority flow. CPU 132 subsequently creates a connection 146 to CPU 134 indicating identified packet application. After establishing a connection 147, CPU 136 sends queue configuration information to egress PFQ via a connection 148 to egress PFQ 120 and transfers the result of the classification in connection to the identified packet to egress PFQ 120. After receiving the result of the classification, a separate output queue is allocated in egress PFQ 120 for the identified packet.

The network configuration or system illustrated in FIG. 1A is configured to provide per flow based bandwidth and service guarantee ingress boundary network node as well as egress boundary network node. In addition, the network system can dynamically create egress queues for an identified flow in accordance with QoS, service class, service delay, jitter guarantee, traffic congestion, and the like. It should be noted that the aggregate bandwidth, delay and jitter can be overcome or mitigated by the application of dedicated egress PFQ assigned to the flow. The system configuration or architecture shown in FIG. 1A illustrates a queuing architecture taking care of dynamic flow queuing. It should be noted that other architecture is possible in providing similar functions. Note that information required to identify a flow comes from predefined and/or external means such as end user policies, deep packet inspection triggers, network policies, et cetera.

In operation, upon detecting a flow, classifier 110 classifies the flow based on its application, session, group applications, group sessions, its source, and its destination, and subsequently sends the result of classification to CPU 132 via a backchannel 145. CPUs 132-136 temporarily create a circuit which is associated with ingress PFQ and egress PFQ with parameters such as bandwidth and QoS parameters. Although the flow, for example, may be connectionless IP or Ethernet packet stream, the flow is temporarily treated as a point-to-point circuit within a router or switch system.

Processing component 130, in one embodiment, obtains circuit creation information from classifier 110, and demands temporary circuits created for identified flows. Optimization, for example, to scale dynamic configurations can be implemented to further improve the capability of flow services and treatments. Information such as destination IP address can be evaluated against the next-hop destination and the result of the evaluation is subsequently forwarded to a centralized control and management system for packet processing. In one example, the centralized control and management system is capable of recursively polling and retrieving next-hop destinations until the hop reaches the egress boundary. As such, a temporary Pseudowire Emulation Edge to Edge ("PWE3") circuit from ingress boundary to the egress boundary is created for a priority or identified flow.

Egress PFQ 120 and output queue 122 provide a routing environment of hybrid co-existence of egress PFQ and aggregate queues. The hybrid queues can take care of mixed routing environment for co-existence of traffic flows. For example, some traffic flows require premium bandwidth and QoS guarantee with gold services while other flows require normal IP and/or Ethernet multipoint aggregate bandwidth and QoS.

With multiple incoming packets entering the system, classifier 110 singles out packets that match with the matching pattern. After checking against FIB 116 for its destination egress port/interface and required QoS, classifier 110 appends internal header of a packet with the result of classification and subsequently informs CPU regarding the flow. After creating a temporary circuit for the flow, CPU creates ingress and egress PFQ dedicated queues for the identified flow of traffic. Dedicated queues are configured with parameters such as Committed Information Rate ("CIR"), Peak Information Rate ("PIR"), Burst Size ("BS"), service class, delay and jitter constraints. In one embodiment, CPU sends necessary destination and next-hop information to a centralized network control and management system for a network wide end-to-end flow creation. Note that the flow is now converted from connectionless multipoint forwarding (i.e., egressing via aggregate egress queues) to a connection oriented circuit-based PFQ on both the ingress and egress line cards.

As described earlier, flows are temporary and the temporary circuits associated with the flows are also temporary. As such, when a flow ends, the circuits associated with the flow need to be deleted or removed to release the resources. Upon deletion of dedicated queues, all packets originally belonging to the flow shall immediately be treated as normal connectionless IP or Ethernet and forwarded accordingly. It should be noted that flow deletion mechanism is similar to flow creation with reversing steps as described earlier. When temporary circuit connections are deleted, network resources previously guaranteed are subsequently released back to the network.

Diagram 100 illustrates a packet forwarding hardware egress PFQ architecture capable of converting connectionless IP and Ethernet flows to an end-to-end connection packet flow. A network system using the egress PFQ provides many advantages. For example, the system using egress PFQ can provide premium application services, such as Software as a Service ("SAAS"), virtualized computing, Content Delivery Network ("CDN") transport, and the like. Moreover, the system can also provide single application in connection with Virtual Private Network ("VPN") for bandwidth and QoS guarantee services. In addition, the system can further scale Session Initiation Protocol ("SIP") sessions to guarantee residential VoIP services. Furthermore, the network system with the egress PFQ can scale bandwidth for residential applications such as Google™ Office or Youtube™ sessions.

Figure 1B:
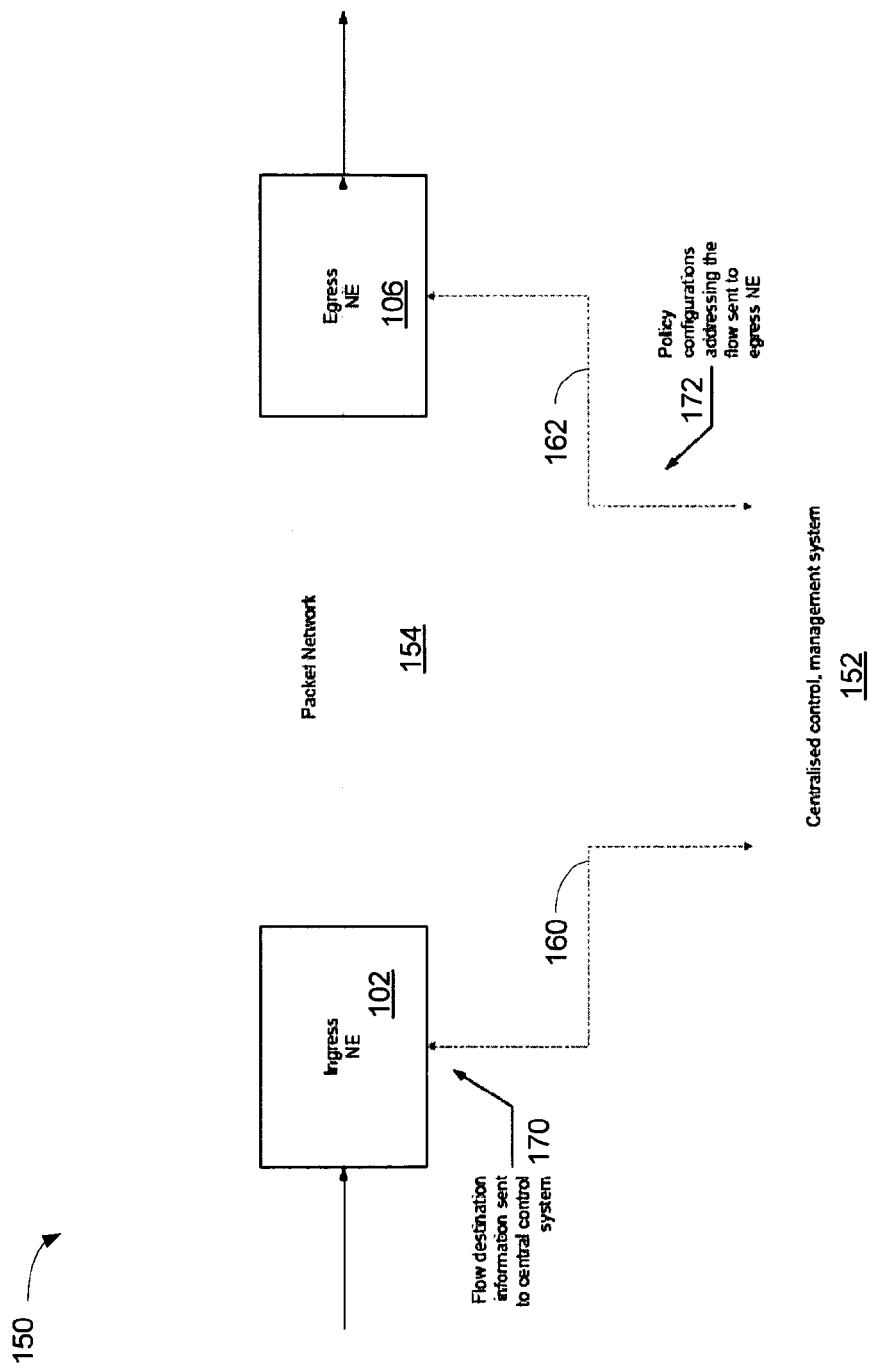
FIG. 1B is a logic block diagram illustrating a network system coupling to a management system in accordance with one embodiment of the present invention.

FIG. 1B is a logic block diagram 150 illustrating a network system coupling to a management system in accordance with one embodiment of the present invention. Diagram 150 includes an ingress component 102, a management system ("MS") 152, a packet network 154, and an egress component 106. Packet network 154, in one embodiment, includes switch fabric 104 shown in FIG. 1A, and is capable of routing data flows or packet flows between ingress component 102 and egress component 106. It should be noted that the underlying concept of the exemplary embodiment(s) of the present invention would not change if one or more blocks (or elements or connections) were added to or removed from diagram 150.

MS 152 can also be referred to as a network managing station ("NMS"), an element management system ("EMS"), a centralized control system, or a centralized control and management system. MS 152 can be a computer, workstation, a server, and/or a cluster of computers capable of executing various network routing and/or management applications. Various network elements ("NEs") and/or nodes in a network are constantly being managed and monitored by at least one MS 152 in a managed network environment. Depending on the applications, multiple management systems can be used to manage and/or monitor one or more NEs in a network. A network can either be a circuit-based network, a packet-based network, or a combination of circuit-based networks and packet-based networks.

MS 152 is coupled with ingress component or NE 102 and egress component or NE 106 via connection 160-162, respectively. Connection 160-162 can be wires, cables, coax connections, wireless connections, and the like. In one embodiment, ingress component 106 is configured to transmit flow destination information to MS 152 via connection 160 while egress component 106 receives policy configurations addressing the flow from MS 152 via connection 162. After receipt of flow destination and/or next-hop information, MS 152, in one embodiment, is able to identify an egress boundary node of the network based on next-hop information.

Figure 2:
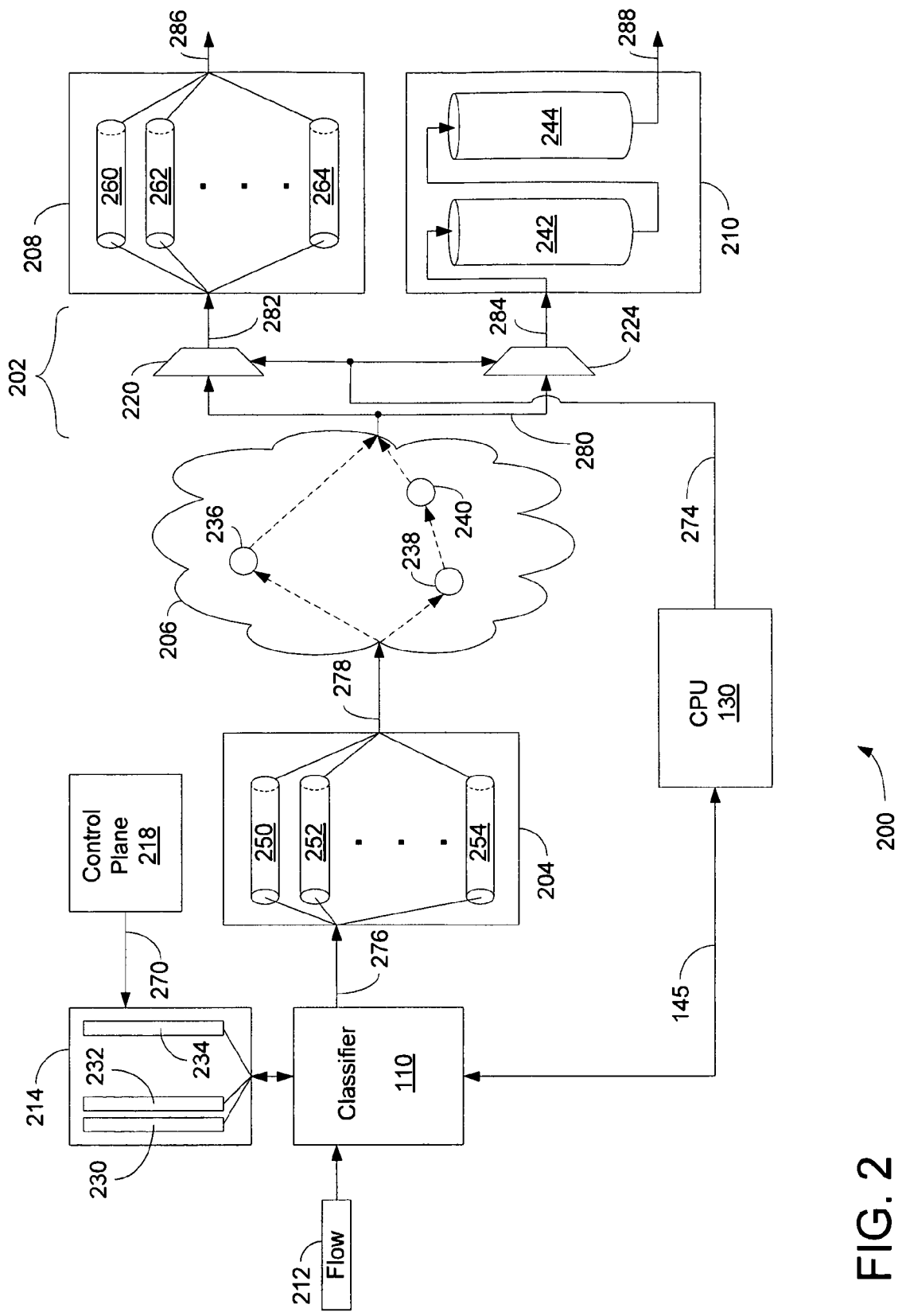
FIG. 2 is a logic diagram illustrating an exemplary configuration capable of improving network performance using an egress per flow queue in accordance with one embodiment of the present invention.

FIG. 2 is a logic diagram 200 illustrating an exemplary configuration capable of improving network performance using an egress PFQ in accordance with one embodiment of the present invention. Diagram 200 includes a classifier 110, an ingress PFQ 204, a switch fabric 206, a CPU 130, an egress PFQ 208, and an aggregate output queue 210. Aggregate output queue ("AOQ") 210, in one example, includes one or more WRR, Strict Priority ("SP") queue, and/or Weighted Fair Queuing ("WFQ"). Diagram 200 further includes an incoming packet flow 212, a routing controller 202, a lookup table 214, and a control plane 218, wherein control plane 218 includes a processor(s) capable of communicating with CPU. It should be noted that the underlying concept of the exemplary embodiment(s) of the present invention would not change if one or more blocks (or elements or connections) were added to or removed from diagram 200.

Lookup table 214, which can be FIB 116 or part of FIB 116, contains various forwarding entries for packet transmission. Lookup table 214 is coupled to control plane 218 via connection 270. Control plane 218, in one embodiment, is a workstation accessible by a user to enter application policies as well as provisioning devices.

Ingress PFQ 204 is coupled with classifier 110 and switch fabric 206 via connections 276 and 278, respectively. In one embodiment, ingress PFQ 204 includes a set of queues 250-254, wherein queues 250-254 can be dynamically allocated in accordance with the identified incoming packet flows. The number of queues 250-254 within ingress PFQ 204 can change based on routing policy(s) created during routing management. A function of ingress PFQ 204 is to improve capabilities for application services including bandwidth and QoS guarantees. After a matching of a predefined classification, packet flow 212 travels from classifier 110 to a corresponding or dedicated queue in ingress PFQ 204 via connection 276 before it is forwarded to switch fabric. It should be noted that ingress PFQ 112 guarantees a minimum bandwidth and minimum service class for routing flow 212.

Switch fabric 206 includes multiple nodes 236-240 capable of routing packet flow 212 over connection 278 to routing controller 202 in accordance with the result of the classification of packet flow 212. A function of switching fabric 206 is to switch data stream or packet flow from an input port to a corresponding output port. It should be noted that each node within switching fabric 206 may also include a set of switching boxes for routing the packet flow 212.

Egress PFQ 208, in one embodiment, includes a set of queues 260-264 wherein each queue can be separately allocated or created on demand in accordance with the packet classification or the result of the classification. A function of egress PFQ 208 is to provide a guaranteed bandwidth and packet services on a per-flow basis. Upon receipt of an incoming packet flow 212, it is classified based on classification information such as packet ID, packet format(s), routing policies, flow length, transmission rates, and so forth. Depending on the results of classifications, queuing outgoing packets in dedicated queues can provide predefined minimum bandwidth as well as service treatment for packet flow 212. Dedicated egress queue(s) for flow 212 is created as soon as a match between a predefined classification and packet flow 212 occurs. The result of the classification is communicated to egress PFQ from CPU 130 via backchannels 145 and 274.

AOQ 210, similar to output queue 122 shown in FIG. 1A, includes queues connected in a serial operable in a round robin scheme as well as strict priority. It should be noted that other types queuing scheme can be used in place of round robin scheme. For example, a normal unidentified flow enters queue 242 of AOQ 210 from a bus 284 and moves through queues 242 and 244 before it exits from AOQ 210 onto a bus 288. Note that queues within AOQ 210 can also be organized in aggregate queues, in which each queue can contain hundreds and thousands of packet flows.

Queuing controller 202, in one embodiment, includes various gating or multiplexing circuits 220-224 capable of deciding whether flow 212 enters egress PFQ 208 or AOQ 210. Controller 202, in one example, receives control signals from CPU 130 via bus 274 and controls the traffic on bus 280. It should be noted that other types of layout of controller 202 are possible to perform similar function but they are shown here since they are not necessary for understanding the embodiment of the present invention.

During a particular operation, upon entering predefined application and classification policies at lookup table 214 from control plane 218, classifier 110 classifies incoming flow 212 in accordance with the predefined policies. The result(s) of the classification(s) is subsequently forwarded to CPU 130 via a backchannel 145 while flow 212 enters a dedicated queue in ingress PFQ 204 waiting to be forwarded. When flow 212 travels to switch fabric 206 for switching to its output port(s), CPU 130 sends the result of the classification to egress PFQ 208 whereby a dedicated queue is allocated for flow 212 based on the result of the classification. Upon entering the dedicated queue in egress PFQ 208, flow 212 is ready to be forwarded to its destination or next-hop destination via bus 286. Alternatively, if flow 212 is an ordinary packet flow, it is subsequently forwarded to AOQ 210 before it is being routed.

The exemplary aspect of the present invention includes various processing steps, which will be described below. The steps of the aspect may be embodied in machine or computer executable instructions. The instructions can be used to cause a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 3:
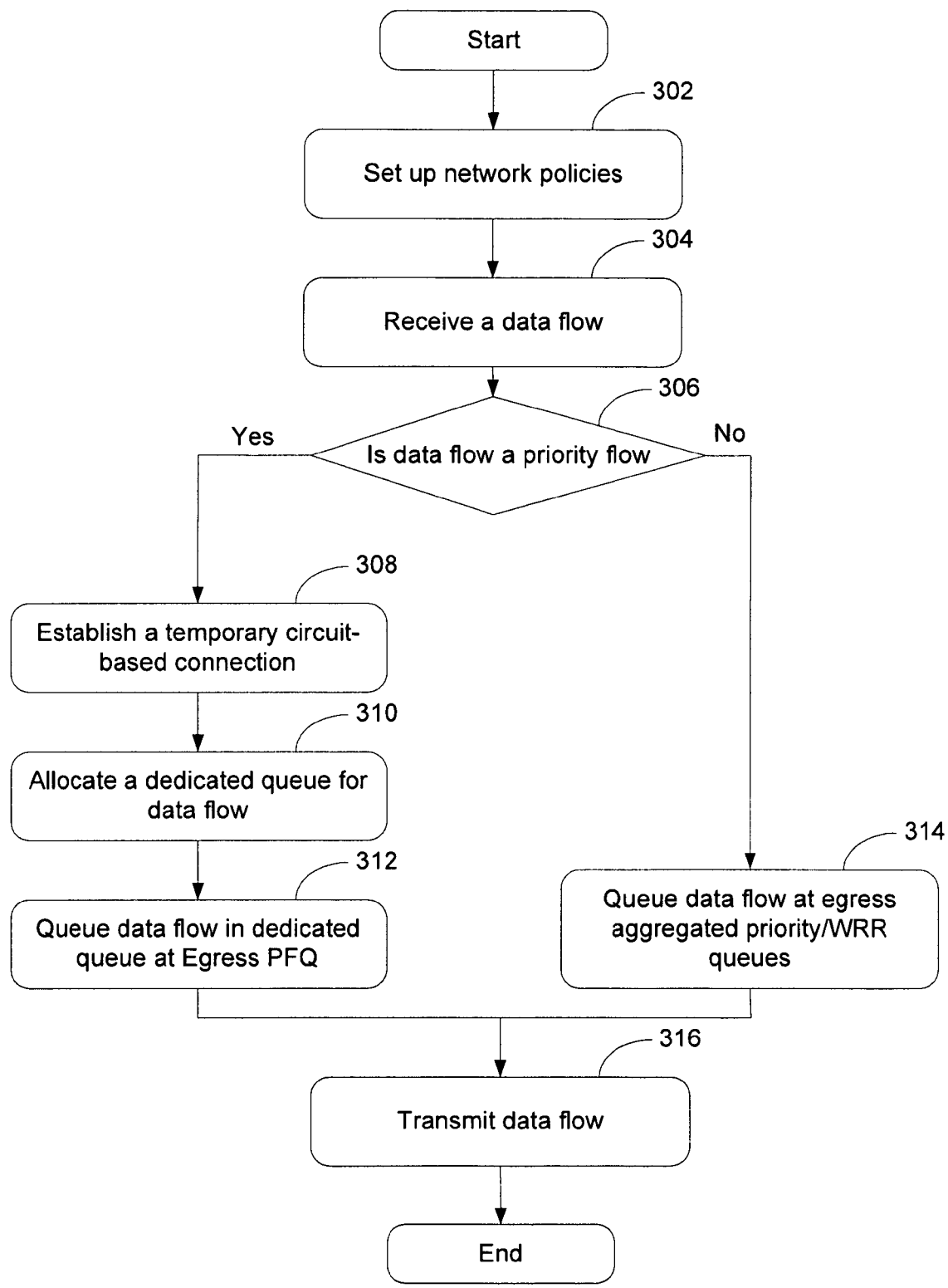
FIG. 3 is a flowchart illustrating a routing process using an egress per flow queue to enhance routing performance in accordance with one embodiment of the present invention.

FIG. 3 is a flowchart 300 illustrating a routing process using an egress PFQ to enhance routing performance in accordance with one embodiment of the present invention. Upon setting up network policies and/or other classification information at block 302, the process, at block 304, receives an incoming data flow at the ingress NE. At block 306, the process exams whether the data flow matches with any network policies and/or predefined classification information.

If there is a match, the data flow is a priority flow and the process proceeds to block 308. Otherwise, the flow is an ordinary packet flow, and the process proceeds to block 314. To identify egress port(s), information stored in the FIB is searched in accordance with incoming packets. For example, after examining the packet header information, one or more egress ports are identified in response to one or more attributes or parameters, such as routing protocols, address learning, policy forwarding rules, and the likes. It should be noted that FIB contains table(s) and/or entries used to match egress port/interface with information patterns from incoming packets such as IP destination address. At block 314, the process queues the data flow at egress AOQ aggregated or WRR queue before the data flow is allowed to be routed to its destination or next destination. After block 314, the process proceeds to block 316.

At block 308, the process establishes a temporary circuit-based connection between classifier and egress PFQ to monitor the data flow on a continuous basis. To determine egress port(s), information stored in the FIB associated with the incoming packet is populated. For example, after examining the packet header information, an egress port(s) is identified in response to its destination. At block 310, the process allocates a dedicated queue or flow queue for the data flow at the egress PFQ for facilitating outgoing of the data flow. At block 312, the data flow is queued in the dedicated queue before it exits from the egress line card.

After block 316, the process transmits the data flow to its destination or next destination. It should be noted that dedicated queue can shorten the queuing time for the flow thereby the flow can reach its destination more quickly.

Figure 4:
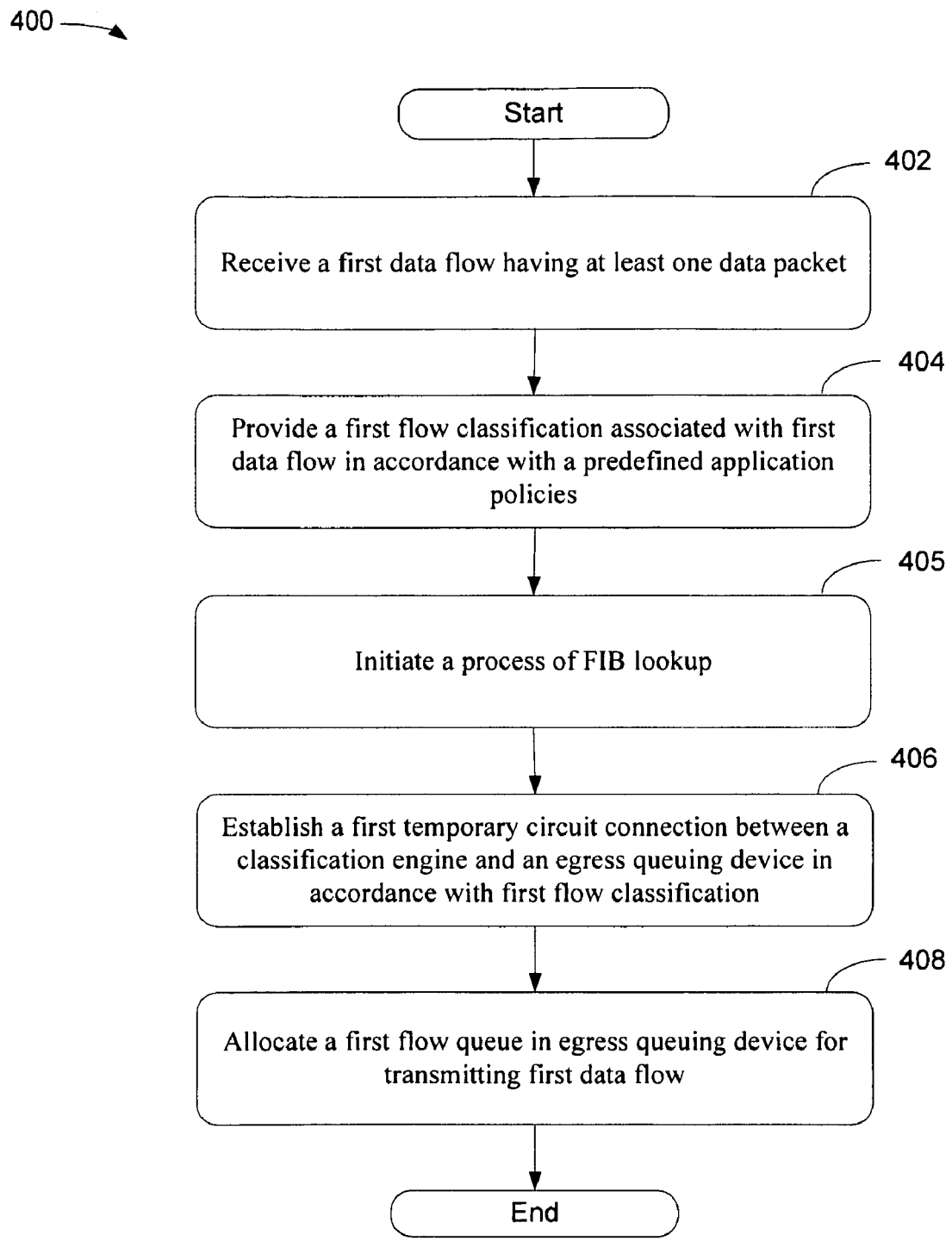
FIG. 4 is a flowchart illustrating a process of creating a separate queue on demand to improve over all routing performance in accordance with one embodiment of the present invention.

FIG. 4 is a flowchart 400 illustrating a process of creating a separate egress queue on demand to improve overall routing performance in accordance with one embodiment of the present invention. At block 402, a routing process receives an incoming data flow having at least one data packet. Upon receiving a set of predefined classification information such as minimum transmitting bandwidth and application policies, the process classifies the incoming data flow in response to the classification information. In one embodiment, the data flow is a connectionless data flow.

At block 404, the process is capable of providing the flow classification or result associated with the data flow in accordance with a set of predefined application policies. For example, the process identifies minimum QoS and application policies in accordance with information relating to the flow classification.

At block 405, a process of identifying and populating information relating to egress interface from the FIB entries is initiated. After examining the packet header information, FIB entries, for instance, are looked up or searched to determine egress port(s) and/or interfaces. Additional information, such as routing protocols, address learning, and policy forwarding rules may also be used to identify the destination of the incoming packet which is then populated into the FIB. Note that FIB contains information capable of matching egress port/interface with information patterns obtained from incoming packets.

At block 406, the process establishes a temporary circuit connection between a classification engine and an egress queuing device in accordance with the flow classification or the result of the classification. It should be noted that establishing a temporary circuit connection can further include creating a point-to-point circuit between the classification engine and an egress queuing device for facilitating flow transmitting.

At block 408, the process allocates a dedicated or flow queue in the egress queuing device for transmitting the data flow. In one embodiment, upon receiving a second data flow having at least one data packet, the process provides a second flow classification or a second result of the classification associated with the second data flow in accordance with a predefined application policies. After establishing a second temporary circuit connection between a classification engine and an egress queuing device in accordance with the second flow classification, the process subsequently allocates a second flow queue in the egress queuing device for transmitting the second data flow. In one embodiment, the process is capable of dynamically adjusting the capacity of the dedicated queue in accordance with information generated by the classifier via a backchannel.

While particular embodiments of the present invention have been shown and described, it will be obvious to those of skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A network system, comprising:
    a classifier operable to provide a first result of classification for a first data flow in accordance with a plurality of predefined application policies;
    an egress per flow queue ("PFQ") coupled to the classifier and configured to dynamically allocate a first dedicated queue in accordance with the first result of classification, and forwarding information base ("FIB") lookup; and a processor coupled to the classifier and configured to establish a temporary backchannel between the classifier and the egress PFQ for managing routing process;
wherein the classifier is operable to provide a notification of detecting a flow with predefined priority to the processor via the temporary backchannel, wherein the temporary backchannel is a connection facilitating a point-to-point circuit between the classifier and the egress PFQ.

2. The network system of claim 1, further comprising a control plane coupled to the processor and configured to receive the plurality of predefined application policies from a user.

3. The network system of claim 2, further comprising a forwarding information base ("FIB") coupled to a classification engine and configured to store a plurality of forwarding entries containing matching egress port with information patterns from incoming packets.

4. The network system of claim 1,
wherein the classifier is operable to provide a second result of classification for a second data flow in accordance with the plurality of predefined application policies;
wherein the egress PFQ is configured to dynamically allocate a second dedicated queue in accordance with the second result of classification; and
wherein the processor is configured to establish second temporary backchannel between a classification engine and the egress PFQ for managing forwarding process.

5. The network system of claim 1, wherein the classifier is a circuit able to classify and transmit connectionless Internet Protocol ("IP") queuing packets.

6. A method for network communication, comprising:
receiving a first data flow having at least one data packet;
providing a first flow classification associated with the first data flow in accordance with a predefined application policies;
establishing a first temporary circuit connection between a classification engine and an egress per flow queue ("PFQ") in accordance with the first flow classification; and
allocating a first dedicated queue in the egress PFQ in response to the first flow classification and forwarding information base ("FIB") lookup for transmitting the first data flow, wherein establishing a first temporary circuit connection includes facilitating a point-to-point circuit between the classification engine and the egress PFQ, wherein providing a first flow classification includes providing a notification of detecting the first flow to a processor via the first temporary circuit.

7. The method of claim 6, further comprising populating information stored in a plurality of forwarding entries containing matching egress ports with information patterns from incoming packets.

8. The method of claim 7, further comprising classifying the first data flow in response to classification information stored in the FIB.

9. The method of claim 8, further comprising:
receiving a second data flow having at least one data packet;
providing a second flow classification associated with the second data flow in accordance with a predefined application policies;
establishing a second temporary circuit connection between a classification engine and an egress queuing device in accordance with the second flow classification; and
allocating a second dedicated queue in the egress queuing device for transmitting the second data flow.

10. The method of claim 6, wherein receiving a first data flow having at least one data packet further includes obtaining a connectionless data flow.

11. The method of claim 6, wherein providing a first flow classification associated with the first data flow further includes identifying Quality of Service ("QoS") and application policies in accordance with information the first flow classification.

12. The method of claim 6, wherein allocating a first dedicated queue in the egress queuing device further includes dynamically adjusting capacity of the first dedicated queue in accordance with information provided by the classification engine via a temporary backchannel.

13. A method for a data flow in a communications network, comprising:
obtaining classification policies associated with predefined identifiable flows via a control plane mechanism;
providing a first result of classification for a first data flow in accordance with a plurality of predefined application policies;
dynamically allocating a first dedicated queue in an egress per flow queue ("PFQ") in response to the first result of classification and forwarding information base ("FIB") lookup; and;
establishing a temporary backchannel between a classifier and the egress PFQ for managing routing process, providing a notification of detecting a flow with predefined priority to a processor via the temporary backchannel, wherein establishing a temporary backchannel includes facilitating a point-to-point circuit between the classifier and the egress PFQ.

14. The method of claim 13, further comprising populating information stored in a plurality of forwarding entries containing matching egress ports with information patterns from incoming packets.

15. The method of claim 14, further comprising:
receiving a second data flow having at least one data packet;
issuing a second notification of detecting a flow with the predefined identifiable flows when the second data flow matches with one of the predefined identifiable flows; and
establishing a second temporary backchannel between a classifier and an egress PFQ in accordance with the second notification.

16. The method of claim 15, wherein obtaining classification policies associated with predefined identifiable flows further includes receiving a plurality of application policies applicable to a plurality of predefined identifiable flows from a network administrator.

* * * * *